(12) United States Patent
Kim

(10) Patent No.: US 11,214,683 B2
(45) Date of Patent: *Jan. 4, 2022

(54) LIQUID CRYSTALLINE POLYMER COMPOSITION FOR CAMERA MODULES

(71) Applicant: Ticona LLC, Florence, KY (US)

(72) Inventor: Young Shin Kim, Erlanger, KY (US)

(73) Assignee: Ticona LLC, Florence, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/012,167

(22) Filed: Sep. 4, 2020

(65) Prior Publication Data

US 2020/0399470 A1 Dec. 24, 2020

Related U.S. Application Data

(60) Continuation of application No. 16/166,259, filed on Oct. 22, 2018, now Pat. No. 10,767,049, which is a
(Continued)

(51) Int. Cl.
| | |
|---|---|
| *C08L 77/12* | (2006.01) |
| *H04N 5/225* | (2006.01) |
| *H01B 1/12* | (2006.01) |
| *C08K 3/30* | (2006.01) |
| *C08L 23/08* | (2006.01) |

(Continued)

(52) U.S. Cl.
CPC .......... *C08L 77/12* (2013.01); *C08K 3/30* (2013.01); *C08L 23/0884* (2013.01); *C08L 33/14* (2013.01); *C08L 63/00* (2013.01); *H01B 1/122* (2013.01); *H04N 5/2252* (2013.01); *H04N 5/2257* (2013.01)

(58) Field of Classification Search
CPC ....... C08K 3/30; C08L 77/12; C08L 23/0884; C08L 33/14; C08L 63/00; H01B 1/122; H04N 5/2252; H04N 5/2257
See application file for complete search history.

(56) References Cited

U.S. PATENT DOCUMENTS

| | | |
|---|---|---|
| 5,508,374 A | 4/1996 | Lee et al. |
| 6,221,962 B1 | 4/2001 | Heino et al. |

(Continued)

FOREIGN PATENT DOCUMENTS

| | | |
|---|---|---|
| CN | 104341721 A | 2/2015 |
| JP | 2006117731 A | 5/2006 |

(Continued)

OTHER PUBLICATIONS

Abstract of WO Patent WO9515360, Jun. 8, 1995, 1 page.
(Continued)

*Primary Examiner* — Mark Kopec
*Assistant Examiner* — Jaison P Thomas
(74) *Attorney, Agent, or Firm* — Dority & Manning, P.A.

(57) ABSTRACT

A polymer composition that is capable of exhibiting a unique combination of ductility (e.g., tensile elongation at break), impact strength (e.g., Charpy notched impact strength), and dimensional stability is provided. For example, the polymer composition may contain a liquid crystalline polymer in combination with an epoxy-functionalized olefin copolymer and an inorganic particulate material.

82 Claims, 1 Drawing Sheet

US 11,214,683 B2

Page 2

Related U.S. Application Data division of application No. 15/227,257, filed on Aug. 3, 2016, now Pat. No. 10,106,682.

(60) Provisional application No. 62/205,865, filed on Aug. 17, 2015.

(51) Int. Cl.
  *C08L 33/14* (2006.01)
  *C08L 63/00* (2006.01)

(56) References Cited

U.S. PATENT DOCUMENTS

| | | | |
|---|---|---|---|
| 6,560,840 B1 | 5/2003 | Jenkins et al. | |
| 6,660,182 B2 | 12/2003 | Jester | |
| 6,730,378 B2 | 5/2004 | Matsuoka et al. | |
| 6,730,731 B2 | 5/2004 | Tobita et al. | |
| 7,445,797 B2 | 11/2008 | Meneghetti et al. | |
| 7,608,666 B2 | 10/2009 | Matsuoka et al. | |
| 7,612,130 B2 | 11/2009 | Kim | |
| 7,648,748 B2 | 1/2010 | Nakane et al. | |
| 7,776,410 B2 | 8/2010 | Nakane et al. | |
| 7,960,473 B2 | 6/2011 | Kobayashi et al. | |
| 8,324,307 B2 | 12/2012 | Harder et al. | |
| 8,361,577 B2 | 1/2013 | Arpin | |
| 8,646,994 B2 | 2/2014 | Kim et al. | |
| 8,658,057 B2* | 2/2014 | Nakayama | C08K 3/36 252/299.01 |
| 8,741,998 B2 | 6/2014 | l'Abee et al. | |
| 8,796,392 B2 | 8/2014 | Luo et al. | |
| 8,834,741 B2* | 9/2014 | Shiraishi | C08K 3/30 252/299.01 |
| 8,852,487 B2 | 10/2014 | Feng et al. | |
| 8,906,259 B2 | 12/2014 | Kim | |
| 8,926,862 B2 | 1/2015 | Kim et al. | |
| 8,932,483 B2 | 1/2015 | Kim | |
| 8,946,333 B2 | 2/2015 | Raman et al. | |
| 9,019,428 B2 | 4/2015 | Shukla et al. | |
| 9,074,070 B2 | 7/2015 | Yung et al. | |
| 9,080,036 B2 | 7/2015 | Luo et al. | |
| 9,085,672 B2 | 7/2015 | Matsubara et al. | |
| 9,090,751 B2 | 7/2015 | Saga et al. | |
| 9,119,307 B2 | 8/2015 | Luo et al. | |
| 9,127,142 B2 | 9/2015 | Luo et al. | |
| 9,284,435 B2 | 3/2016 | Kim | |
| 9,355,753 B2 | 5/2016 | Kim | |
| 9,512,293 B2 | 12/2016 | Kim | |
| 9,512,312 B2 | 12/2016 | Mazahir et al. | |
| 9,845,389 B2 | 12/2017 | Harder et al. | |
| 10,106,682 B2 | 10/2018 | Kim | |
| 2002/0172786 A1 | 11/2002 | Matsuoka et al. | |
| 2003/0096070 A1 | 5/2003 | Matsuoka et al. | |
| 2005/0186438 A1 | 8/2005 | Alms et al. | |
| 2007/0182059 A1* | 8/2007 | Ikegawa | C08L 67/00 264/234 |
| 2009/0152491 A1 | 6/2009 | Saga | |
| 2010/0297453 A1 | 11/2010 | Maenaka et al. | |
| 2011/0189455 A1 | 8/2011 | Fukuhara et al. | |
| 2012/0232188 A1 | 9/2012 | Nakayama | |
| 2013/0098666 A1 | 4/2013 | Lee | |
| 2013/0119317 A1 | 5/2013 | Kim et al. | |
| 2013/0123420 A1 | 5/2013 | Kim | |
| 2013/0146344 A1 | 6/2013 | Lee et al. | |
| 2013/0156565 A1 | 6/2013 | Feng | |
| 2013/0157780 A1 | 6/2013 | Kim et al. | |
| 2014/0004328 A1 | 1/2014 | Kim et al. | |
| 2014/0154479 A1 | 6/2014 | Yun et al. | |
| 2014/0171575 A1 | 6/2014 | Mercx et al. | |
| 2014/0264183 A1 | 9/2014 | Kim | |
| 2014/0272226 A1* | 9/2014 | Kim | C09K 19/52 428/36.4 |
| 2014/0316041 A1 | 10/2014 | Mehta | |
| 2015/0104165 A1* | 4/2015 | Kim | G03B 17/02 396/529 |
| 2015/0112019 A1 | 4/2015 | Kim et al. | |
| 2015/0175805 A1 | 6/2015 | Schaefer | |
| 2015/0225547 A1 | 8/2015 | Tu et al. | |
| 2015/0274964 A1* | 10/2015 | Washio | C08L 23/0884 524/513 |
| 2015/0291776 A1 | 10/2015 | Kim | |
| 2015/0291796 A1 | 10/2015 | Kim | |
| 2015/0368460 A1 | 12/2015 | Sohn et al. | |
| 2016/0053072 A1 | 2/2016 | Yung et al. | |
| 2016/0053107 A1 | 2/2016 | Mazahir et al. | |
| 2016/0053117 A1 | 2/2016 | Nair et al. | |
| 2016/0053118 A1 | 2/2016 | Nair et al. | |
| 2016/0152801 A1 | 6/2016 | Yu et al. | |
| 2016/0185940 A1 | 6/2016 | Kim | |
| 2017/0029596 A1 | 2/2017 | Kim et al. | |
| 2017/0029682 A1 | 2/2017 | Kim et al. | |
| 2019/0161612 A1 | 5/2019 | Kim | |

FOREIGN PATENT DOCUMENTS

| | | |
|---|---|---|
| KR | 20120059382 A | 6/2012 |
| WO | WO 2013/129338 A1 | 6/2013 |
| WO | WO 2014/087842 A1 | 6/2014 |
| WO | WO 2017/110424 A1 | 6/2017 |
| WO | WO 2018/051980 A1 | 3/2018 |

OTHER PUBLICATIONS

Abstract of Japanese Patent JPH08134334, May 28, 1996, 2 pages.
Abstract of Japanese Patent JP2000080289, Mar. 21, 2000, 1 page.
Abstract of Japanese Patent JP2000313812, Nov. 14, 2000, 1 page.
Abstract of Japanese Patent JP2000313798, Nov. 14, 2000, 1 page.
Abstract of Japanese Patent JP2005023094, Jan. 27, 2005, 2 pages.
Abstract of Japanese Patent JP2005187809, Jul. 14, 2005, 1 page.
Abstract of Japanese Patent JP2006117731, May 11, 2006, 1 page.
Abstract of Japanese Patent JP2006089701, Jun. 6, 2006, 1 page.
Abstract of EP Patent EP1703234, Sep. 20, 2006, 2 pages.
Abstract of Japanese Patent JP2006327301, Dec. 7, 2006, 2 pages.
Abstract of Japanese Patent JP2006347151, Dec. 28, 2006, 1 page.
Abstract of WO Patent WO2007043701, Apr. 19, 2007, 1 page.
Abstract of Japanese Patent JP2007211211, Aug. 23, 2007, 1 page.
Abstract of Japanese Patent JP2007238851, Sep. 20, 2007, 1 page.
Abstract of Japanese Patent JP2007254716, Oct. 4, 2007, 1 page.
Abstract of Japanese Patent JP2007254717, Oct. 4, 2007, 1 page.
Abstract of Japanese Patent JP2007277292, Oct. 25, 2007, 1 page.
Abstract of Chinese Patent CN101305056, Nov. 12, 2008, 1 page.
Abstract of Japanese Patent JP4600015, Dec. 15, 2010, 1 page.
Abastract of Japanese Patent JP4600016, Dec. 15, 2010, 1 page.
Abstract of Japanese Patent JP2011137064, Jul. 14, 2011, 1 page.
Abstract of Japanese Patent JP2012251130, Dec. 20, 2012, 2 pages.
Abstract of Japanese Patent JP2013014781, Jan. 24, 2013, 1 page.
Abstract of WO Patent WO2013129338, Sep. 6, 2013, 1 page.
Abstract of WO Patent WO2014087842, Jun. 12, 2014, 1 page.
Abstract of Japanese Patent JP2015000949, Jan. 5, 2015, 1 page.
Abstract of Japanese Patent JP2015021110, Feb. 2, 2015, 1 page.
Abstract of Korean Patent KR20150011768, Feb. 2, 2015, 1 page.
Abstract of Chinese Patent CN104341721, Feb. 11, 2015, 1 page.
Abstract of Taiwanese Patent TW201522578, Jun. 16, 2015, 2 pages.
Product Bulletin for Boron Nitride Powder from Momentive, Sep. 2012, 2 pages.
Product Bulletin for PolarTherm Boron Nitride Powder from Momentive, Sep. 2012, 2 pages.
Material Property Data for DuPont Elvaloy® PTW Ethylene/N-Butyl Acrylate/Glycidyl Methacrylate Copolymer from E. I. du Pont de Nemours and Company, Inc., Aug. 10, 2015, 2 pages.
Product Data Sheet for Elvaloy ® resins from E. I. du Pont de Nemours and Company, Inc., Jun. 8, 2015, 3 pages.
Product Information on LOTADER ® AX8840 from Arkema, Apr. 2014, 2 pages.
Material Safety Data Sheet on LOTADER® AX8840 from Arkema, Jul. 11, 2011, 8 pages.
Machine Translation of Chinese Patent CN101305056, Nov. 12, 2008, 13 pages.

(56) References Cited

OTHER PUBLICATIONS

Machine Translation of Chinese Patent CN104040422, Sep. 10, 2014, 20 pages.
Bryce, C. "Plastic Injection Molding . . . manufacturing process fundamentals," Society of Manufacturing Engineers, p. 198, 1996 (Year: 1996).
International Search Report and Written Opinion for PCT/US16/45287 dated Oct. 7, 2016, 10 pages.

\* cited by examiner

LIQUID CRYSTALLINE POLYMER COMPOSITION FOR CAMERA MODULES

RELATED APPLICATIONS

The present application is a continuation of U.S. application Ser. No. 16/166,259 having a filing date of Oct. 22, 2018 which is a divisional of U.S. application Ser. No. 15/227,257 having a filing date of Aug. 3, 2016 (U.S. Pat. No. 10,106,682), which claims priority to U.S. Provisional Application Ser. No. 62/205,865, filed on Aug. 17, 2015, which are incorporated herein in their entirety by reference thereto.

BACKGROUND OF THE INVENTION

Camera modules (or components) are often employed in mobile phones, laptop computers, digital cameras, digital video cameras, etc. Examples include, for instance, compact camera modules that include a carrier mounted to a base, digital camera shutter modules, components of digital cameras, cameras in games, medical cameras, surveillance cameras, etc. Such camera modules have become more complex and now tend to include more moving parts. In some cases, for example, two compact camera module assemblies can be mounted within a single module to improve picture quality ("dual camera" modules). In other cases, an array of compact camera modules can be employed. As the design of these parts become more complex, it is increasingly important that the polymer compositions used to form the molded parts of camera modules are sufficiently ductile so that they can survive the assembly process. The polymer compositions must also be capable of absorbing a certain degree of impact energy during use without breaking or chipping. To date, most conventional techniques involve the use of fibrous fillers to help improve the strength and other properties of the polymer composition. Unfortunately, however, these techniques ultimately just lead to other problems, such as poor dimensional stability of the part when it is heated.

As such, a need exists for an improved polymer composition for use in the molded parts of camera modules.

SUMMARY OF THE INVENTION

In accordance with one embodiment of the present invention, a polymer composition is disclosed that comprises 100 parts by weight of at least one liquid crystalline polymer; from about 50 to about 90 parts by weight of an inorganic particulate material having a hardness value of about 2.5 or more based on the Mohs hardness scale and an average size of from about 0.1 to about 35 micrometers; and from about 1 to about 15 parts by weight of an epoxy-functionalized olefin copolymer.

In accordance with another embodiment of the present invention, a molded part for a camera module is disclosed. The molded part comprises a polymer composition that includes a liquid crystalline polymer. The composition exhibits a tensile elongation at break of about 3.5% or more as determined in accordance with ISO Test No. 527:2012 at 23° C., a Charpy notched impact strength of about 6 kJ/m² or more as determined in accordance with ISO Test No. 179-1:2010 at 23° C., and a dimensional stability of about 6 or less as determined in accordance with ISO 294-4:2001 using a Type D2 specimen.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
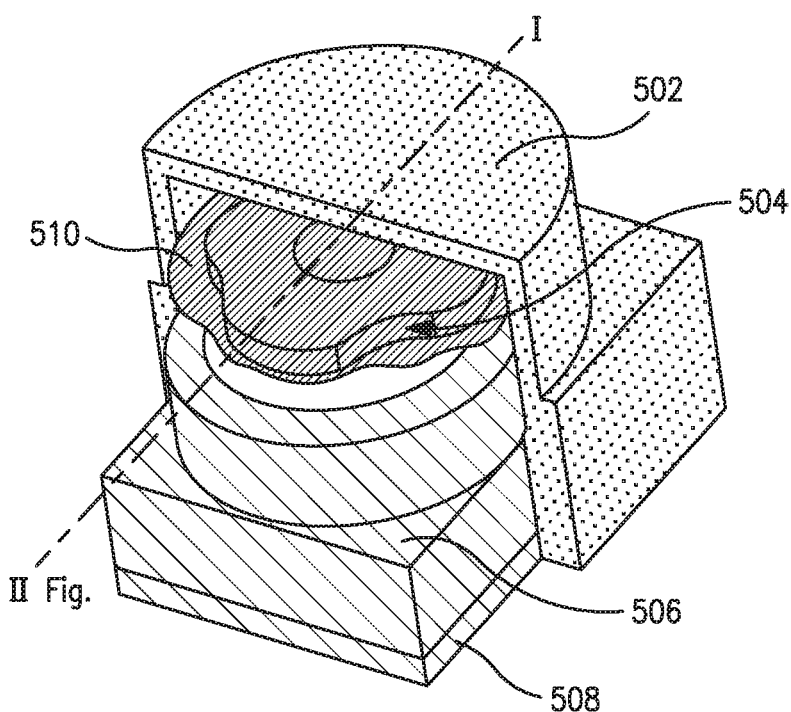
FIGS. 1-2 are perspective and front views of a compact camera module ("CCM") that may be formed in accordance with one embodiment of the present invention.

It is to be understood by one of ordinary skill in the art that the present discussion is a description of exemplary embodiments only, and is not intended as limiting the broader aspects of the present invention.

Generally speaking, the present invention is directed to a polymer composition that is capable of exhibiting a unique combination of ductility (e.g., tensile elongation at break) and impact strength (e.g., Charpy notched impact strength) to enable its use in complex camera module designs. For example, the polymer composition may exhibit a tensile elongation at break of about 3.5% or more, in some embodiments about 4% or more, in some embodiments from about 4.5% to about 20%, and in some embodiments, from about 5% to about 10%, as determined in accordance with ISO Test No. 527:2012 (technically equivalent to ASTM D638-14 at 23° C. The composition may also possess a Charpy notched impact strength of about 6 kJ/m² or more, in some embodiments about 6.5 kJ/m² or more, in some embodiments from about 7 to about 25 kJ/m², and in some embodiments, from about 8 to about 20 kJ/m², measured at 23° C. according to ISO Test No. 179-1:2010 (technically equivalent to ASTM D256-10, Method B). Contrary to conventional wisdom, it is has been discovered that such a balance of ductility and high impact strength can be achieved without adversely impacting dimensional stability. More particularly, the composition may exhibit a dimensional stability of about 6 or less, in some embodiments about 5 or less, in some embodiments from about 0.5 to about 5, and in some embodiments, from about 1 to about 4.5. The "dimensional stability" may be determined by dividing the degree of shrinkage in the transverse direction by the degree of shrinkage in the machine direction, which may be determined in accordance with ISO 294-4:2001 using a Type D2 specimen (technically equivalent to ASTM D955-08(2014)). The degree of shrinkage in the transverse direction ("Sr") may, for instance, be from about 0.2% to about 1.5%, in some embodiments from about 0.4% to about 1.2%, and in some embodiments, from about 0.5% to about 1.0%, while the degree of shrinkage in the machine direction ("$S_F$") may be from about 0.02% to about 0.6%, in some embodiments from 0.05% to about 0.5%, and in some embodiments, from about 0.1% to about 0.4%.

The present inventors have discovered that the ability to achieve a part with such a unique combination of properties can be achieved through selective control over the nature of the components employed in the polymer composition, and their relative concentration. For example, the polymer composition may contain a liquid crystalline polymer in combination with an epoxy-functionalized olefin copolymer and an inorganic particulate material having a hardness value of about 2.5 or more, in some embodiments about 3.0 or more, in some embodiments from about 3.0 to about 11.0, in some embodiments from about 3.5 to about 11.0, and in some embodiments, from about 4.5 to about 6.5 based on the Mohs hardness scale. Such materials also typically have a median size (e.g., diameter) of from about 0.1 to about 35 micrometers, in some embodiments from about 2 to about 20 micrometers, in some embodiments from about 3 to about 15 micrometers, and in some embodiments, from about 7 to about 12 micrometers, such as determined using laser diffraction techniques in accordance with ISO 13320:2009 (e.g., with a Horiba LA-960 particle size distribution analyzer). The material may also have a narrow size distribution. That is, at least about 70% by volume of the particles, in some embodiments at least about 80% by volume of the particle material, and in some embodiments, at least about 90% by volume of the material may have a size within the ranges noted above.

The inorganic particulate material is typically employed in an amount of from about 50 to about 90 parts, in some embodiments from about 55 to about 85 parts, and in some embodiments, from about 60 to about 80 parts by weight per 100 parts of the liquid crystalline polymer. Likewise, the epoxy-functionalized olefin copolymer is typically employed in the polymer composition in an amount of from about 1 to about 15 parts, in some embodiments from about 2 to about 12 parts, and in some embodiments, from about 3 to about 10 parts by weight per 100 parts of the liquid crystalline polymer. For example, the inorganic particulate material typically constitutes from about 20 wt. % to about 60 wt. %, in some embodiments from about 25 wt. % to about 55 wt. %, and in some embodiments, from about 30 wt. % to about 50 wt. % of the polymer composition, while the epoxy-functionalized olefin copolymer typically constitutes from about 0.1 wt. % to about 20 wt. %, in some embodiments from about 0.5 wt. % to about 15 wt. %, and in some embodiments, from about 1 wt. % to about 10 wt. % of the polymer composition. Liquid crystalline polymers may also constitute from about 20 wt. % to about 80 wt. %, in some embodiments from about 30 wt. % to about 70 wt. %, and in some embodiments, from about 35 wt. % to about 60 wt. % of the polymer composition.

Various embodiments of the present invention will now be described in more detail.

I. Liquid Crystalline Polymer

The liquid crystalline polymer employed in the polymer composition is generally classified as "thermotropic" to the extent that it can possess a rod-like structure and exhibit a crystalline behavior in their molten state (e.g., thermotropic nematic state). The polymer has a relatively high melting temperature, such as from about 250° C. to about 400° C., in some embodiments from about 280° C. to about 390° C., and in some embodiments from about 300° C. to about 380° C. Such polymers may be formed from one or more types of repeating units as is known in the art. The liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

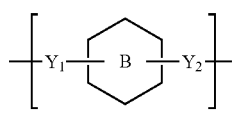
(I)

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments, from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties.

In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments, from about 45 mol. % to about 70% of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35% of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments, from about 5 mol. % to about 20% of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments from about 3 mol. % to about 25 mol. % when employed.

II. Inorganic Particulate Material

As noted above, an inorganic particulate material having a certain hardness value may be employed in the polymer composition. Examples of such a particulate material may include, for instance, carbonates, such as calcium carbonate ($CaCO_3$, Mohs hardness of 3.0) or a copper carbonate hydroxide ($Cu_2CO_3(OH)_2$, Mohs hardness of 4.0); fluorides, such as calcium fluoride ($CaFl_2$, Mohs hardness of 4.0); phosphates, such as calcium pyrophosphate (($Ca_2P_2O_7$, Mohs hardness of 5.0), anhydrous dicalcium phosphate ($CaHPO_4$, Mohs hardness of 3.5), or hydrated aluminum phosphate ($AlPO_4.2H_2O$, Mohs hardness of 4.5); silicates, such as silica ($SiO_2$, Mohs hardness of 6.0), potassium aluminum silicate ($KAISi_3O_8$, Mohs hardness of 6), or copper silicate ($CuSiO_3.H_2O$, Mohs hardness of 5.0); borates, such as calcium borosilicate hydroxide ($Ca_2B_5SiO_9$(OH)$_5$, Mohs hardness of 3.5); alumina ($AlO_2$, Mohs hardness of 10.0); sulfates, such as calcium sulfate ($CaSO_4$, Mohs hardness of 3.5) or barium sulfate ($BaSO_4$, Mohs hardness of from 3 to 3.5); and so forth, as well as combinations thereof.

III. Epoxy-Functionalized Olefin Copolymer

As stated above, an olefin copolymer is also employed that is "epoxy-functionalized" in that it contains, on average, two or more epoxy functional groups per molecule. The copolymer generally contains an olefinic monomeric unit that is derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene, 3,3-dimethyl-1-butene, 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, 1-dodecene, and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

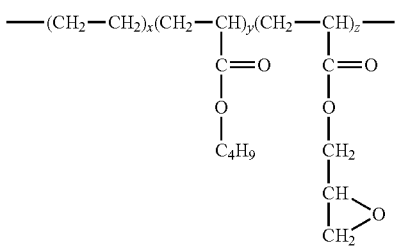

wherein, x, y, and z are 1 or greater.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The result melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and has a glycidyl methacrylate monomer content of 8 wt. %. Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

IV. Electrically Conductive Filler

Although optional, an electrically conductive filler may also be employed in the polymer composition to help reduce the tendency to create a static electric charge during a molding operation, transportation, collection, assembly, etc. In fact, the presence of a controlled size and amount of the inorganic particulate material, as noted above, can enhance the ability of the conductive filler to be dispersed within the liquid crystalline polymer matrix, thereby allowing allow for the use of relatively low concentrations of the conductive filler to achieve the desired antistatic properties. Because it is employed in relatively low concentrations, however, the impact on thermal and mechanical properties can be minimized. In this regard, conductive fillers, when employed, typically constitute from about 0.1 wt. % to about 30 wt. %, in some embodiments from about 0.3 wt. % to about 20 wt. %, in some embodiments from about 0.4 wt. % to about 5 wt. %, and in some embodiments, from about 0.5 wt. % to about 1.5 wt. % of the polymer composition.

Any of a variety of conductive fillers may generally be employed in the polymer composition to help improve its antistatic characteristics. Examples of suitable conductive fillers may include, for instance, metal particles (e.g., aluminum flakes), metal fibers, carbon particles (e.g., graphite, expanded graphite, grapheme, carbon black, graphitized carbon black, etc.), carbon nanotubes, carbon fibers, and so forth. Carbon fibers and carbon particles (e.g., graphite) are particularly suitable. When employed, suitable carbon fibers may include pitch-based carbon (e.g., tar pitch), polyacrylonitrile-based carbon, metal-coated carbon, etc. Desirably, the carbon fibers have a high purity in that they possess a relatively high carbon content, such as a carbon content of about 85 wt. % or more, in some embodiments about 90 wt. % or more, and in some embodiments, about 93 wt. % or more. For instance, the carbon content can be at least about 94% wt., such as at least about 95% wt., such as at least about 96% wt., such at least about 97% wt., such as even at least about 98% wt. The carbon purity is generally less than 100 wt. %, such as less than about 99 wt. %. The density of the carbon fibers is typically from about 0.5 to about 3.0 g/cm$^3$, in some embodiments from about 1.0 to about 2.5 g/cm$^3$, and in some embodiments, from about 1.5 to about 2.0 g/cm$^3$.

In one embodiment, the carbon fibers are incorporated into the matrix with minimal fiber breakage. The volume average length of the fibers after molding can generally be from about 0.1 mm to about 1 mm even when using a fiber having an initial length of about 3 mm. The average length and distribution of the carbon fibers can also be selectively controlled in the final polymer composition to achieve a better connection and electrical pathway within the liquid crystalline polymer matrix. The average diameter of the fibers can be from about 0.5 to about 30 micrometers, in some embodiments from about 1 to about 20 micrometers, and in some embodiments, from about 3 to about 15 micrometers.

To improve dispersion within the polymer matrix, the carbon fibers may be at least partially coated with a sizing agent that increases the compatibility of the carbon fibers with the liquid crystalline polymer. The sizing agent may be stable so that it does not thermally degrade at temperatures at which the liquid crystalline polymer is molded. In one embodiment, the sizing agent may include a polymer, such as an aromatic polymer. For instance, the aromatic polymer may have a thermal decomposition temperature of greater than about 300° C., such as greater than about 350° C., such as greater than about 400° C. As used herein, the thermal decomposition temperature of a material is the temperature at which the material losses 5% of its mass during thermogravimeteric analysis as determined in accordance with ASTM Test E 1131 (or ISO Test 11358). The sizing agent can also have a relatively high glass transition temperature.

For instance, the glass transition temperature of the sizing agent can be greater than about 300° C., such as greater than about 350° C., such as greater than about 400° C. Particular examples of sizing agents include polyimide polymers, aromatic polyester polymers including wholly aromatic polyester polymers, and high temperature epoxy polymers. In one embodiment, the sizing agent may include a liquid crystalline polymer. The sizing agent can be present on the fibers in an amount of at least about 0.1% wt., such as in an amount of at least 0.2% wt., such as in an amount of at least about 0.1% wt. The sizing agent is generally present in an amount less than about 5% wt., such as in an amount of less than about 3% wt.

Another suitable conductive filler is an ionic liquid. One benefit of such a material is that, in addition to being electrically conductive, the ionic liquid can also exist in liquid form during melt processing, which allows it to be more uniformly blended within the liquid crystalline polymer matrix. This improves electrical connectivity and thereby enhances the ability of the composition to rapidly dissipate static electric charges from its surface.

The ionic liquid is generally a salt that has a low enough melting temperature so that it can be in the form of a liquid when melt processed with the liquid crystalline polymer. For example, the melting temperature of the ionic liquid may be about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, quaternary oniums having the following structures:

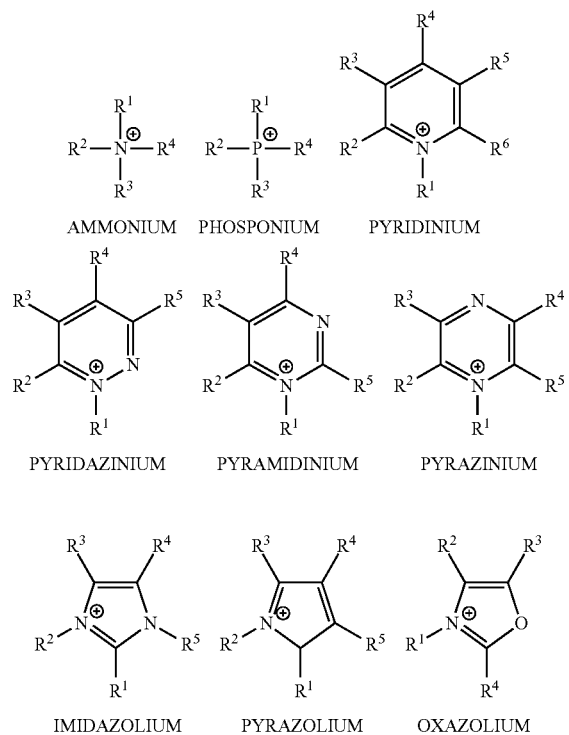

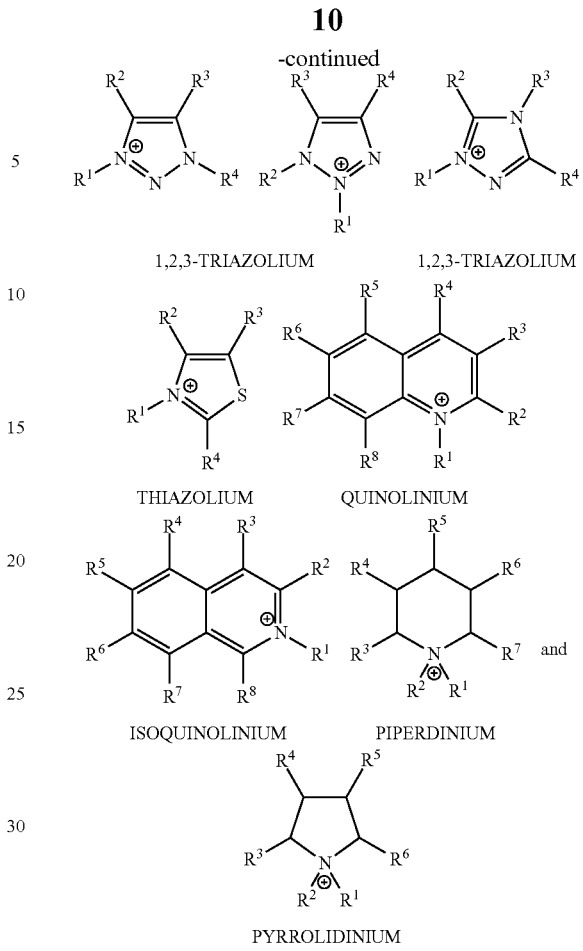

wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexenyl, etc.); substituted or unsubstituted alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted alkoxy groups (e.g., methoxy, ethoxy, n-propoxy, isopropoxy, n-butoxy, t-butoxy, sec-butoxy, n-pentoxy, etc.); substituted or unsubstituted acyloxy groups (e.g., methacryloxy, methacryloxyethyl, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth. In one particular embodiment, for example, the cationic species may be an ammonium compound having the structure $N+R^1R^2R^3R^4$, wherein $R^1$, $R^2$, and/or $R^3$ are independently a $C_1$-$C_6$ alkyl (e.g., methyl, ethyl, butyl, etc.) and $R^4$ is hydrogen or a $C_1$-$C_4$ alkyl group (e.g., methyl or ethyl). For example, the cationic component may be tri-butylmethylammonium, wherein $R^1$, $R^2$, and $R^3$ are butyl and $R^4$ is methyl.

Suitable counterions for the cationic species may include, for example, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing. To help improve compatibility with the liquid crystalline polymer, it may be desired to select a counterion that is generally hydrophobic in nature, such as imides, fatty acid carboxylates, etc. Particularly suitable hydrophobic counterions may include, for instance, bis(pentafluoroethylsulfonyl)imide, bis(trifluoromethylsulfonyl)imide, and bis(trifluoromethyl)imide.

V. Other Components

A wide variety of additional additives can also be included in the polymer composition, such as lubricants, thermally conductive fillers, pigments, antioxidants, stabilizers, surfactants, waxes, flame retardants, anti-drip additives, and other materials added to enhance properties and processability. Lubricants, for example, may be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

As noted above, one beneficial aspect of the present invention is that good mechanical properties may be achieved without adversely impacting the dimensional stability of the resulting part. To help ensure that this dimensional stability is maintained, it is generally desirable that the polymer composition remains substantially free of conventional fibrous fillers, such as glass fibers and mineral fibers. Thus, if employed at all, such fibers typically constitute no more than about 10 wt. %, in some embodiments no more than about 5 wt. %, and in some embodiments, from about 0.001 wt. % to about 3 wt. % of the polymer composition.

VI. Formation

The liquid crystalline polymer, inorganic particulate material, epoxy-functionalized olefin copolymer, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. If desired, the inorganic particulate material and epoxy-functionalized olefin copolymer can be added to the extruder a location downstream from the point at which the liquid crystalline polymer is supplied. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the present inventors have discovered that the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 1 to about 200 Pa-s, in some embodiments from about 5 to about 180 Pa-s, in some embodiments from about 10 to about 150 Pa-s, and in some embodiments, from about 20 to about 120 Pa-s, determined at a shear rate of 1000 seconds$^{-1}$. Melt viscosity may be determined in accordance with ISO Test No. 11443:2005 at a temperature that is 15° C. higher than the melting temperature of the composition (e.g., 350° C.).

VII. Molded Parts

Once formed, the polymer composition may be molded into a shaped part. For example, the shaped part may be molded using a one-component injection molding process in which dried and preheated plastic granules are injected into the mold. Regardless of the technique employed, it has been discovered that the molded part of the present invention may have a relatively smooth surface, which may be represented by its surface glossiness). For example, the surface glossiness as determined using a gloss meter at an angle of from about 80° to about 85° may be about 35% or more, in some embodiments about 38% or more, and in some embodiments, from about 40% to about 60%. Conventionally, it was believed that parts having such a smooth surface would not also possess sufficiently good mechanical properties. Contrary to conventional thought, however, the molded part of the present invention has been found to possess excellent mechanical properties. For example, the part may possess a high weld strength, which is useful when forming the thin part of a camera module. For example, the part may exhibit a weld strength of from about 10 kilopascals ("kPa") to about 100 kPa, in some embodiments from about 20 kPa to about 80 kPa, and in some embodiments, from about 40 kPa to about 70 kPa, which is the peak stress as determined in accordance with ISO Test No. 527-1:2012 (technically equivalent to ASTM D638-14) at 23° C.

The tensile and flexural mechanical properties are also good. For example, the part may exhibit a tensile strength of from about 20 to about 500 MPa, in some embodiments from about 50 to about 400 MPa, and in some embodiments, from about 60 to about 350 MPa and/or a tensile modulus of from about 4,000 MPa to about 20,000 MPa, in some embodiments from about 5,000 MPa to about 18,000 MPa, and in some embodiments, from about 6,000 MPa to about 12,000 MPa. The tensile properties may be determined in accordance with ISO Test No. 527:2012 (technically equivalent to ASTM D638-14) at 23° C. The part may also exhibit a flexural strength of from about 20 to about 500 MPa, in some embodiments from about 50 to about 400 MPa, and in some embodiments, from about 80 to about 350 MPa and/or a flexural modulus of from about 4,000 MPa to about 20,000 MPa, in some embodiments from about 5,000 MPa to about 18,000 MPa, and in some embodiments, from about 6,000 MPa to about 15,000 MPa. The flexural properties may be determined in accordance with ISO Test No. 178:2010 (technically equivalent to ASTM D790-10) at 23° C. The molded part may also exhibit a deflection temperature under load (DTUL) of about 190° C. or more, and in some embodiments, from about 200° C. to about 280° C., as measured according to ASTM D648-07 (technically equivalent to ISO Test No. 75-2:2013) at a specified load of 1.8 MPa. The Rockwell hardness of the part may also be about 25 or more, some embodiments about 30 or more, and in some embodiments, from about 35 to about 80, as determined in accordance with ASTM D785-08 (Scale M).

In addition, the molded part can also have excellent antistatic behavior, particularly when a conductive filler is included within the polymer composition as discussed above. Such antistatic behavior can be characterized by a relatively low surface and/or volume resistivity as determined in accordance with IEC 60093. For example, the molded part may exhibit a surface resistivity of about $1 \times 10^{15}$ ohms or less, in some embodiments about $1 \times 10^{14}$ ohms or less, in some embodiments from about $1 \times 10^{10}$ ohms to about $9 \times 10^{13}$ ohms, and in some embodiments, from about $1 \times 10^{11}$ to about $1 \times 10^{13}$ ohms. Likewise, the molded part may also exhibit a volume resistivity of about $1 \times 10^{15}$ ohm-m or less, in some embodiments from about $1 \times 10^{9}$ ohm-m to about $9 \times 10^{14}$ ohm-m, and in some embodiments, from about $1 \times 10^{10}$ to about $5 \times 10^{14}$ ohm-m. Of course, such antistatic behavior is by no means required. For example, in some embodiments, the molded part may exhibit a relatively high surface resistivity, such as about $1 \times 10^{15}$ ohms or more, in some embodiments about $1 \times 10^{16}$ ohms or more, in some embodiments from about $1 \times 10^{17}$ ohms to about $9 \times 10^{30}$ ohms, and in some embodiments, from about $1 \times 10^{18}$ to about $1 \times 10^{26}$ ohms.

In certain applications, the molded part may be joined together with one or more additional components (e.g., molded parts, metals, etc.). Notably, the enhanced ductility of the molded part of the present invention can allow it to be readily joined together with another component using techniques not previously thought possible. In one embodiment, for example, a heat staking technique may be employed. In such embodiments, a plurality of receiving holes may initially be formed in adjacent components, such as around the periphery of the components, and a plurality of heat-stakes may thereafter be inserted into corresponding receiving holes. Once inserted, a staking device may be used to subject the heating stakes to heat and pressure so that they effectively join together the adjacent components. Of course, apart from heat staking, other known techniques can also be employed, such as adhesive bonding, welding, etc.

VIII. Applications

The polymer composition and/or shaped molded part can be used in a variety of applications. For example, the molded part can be employed in lighting assemblies, battery systems, sensors and electronic components, portable electronic devices such as smart phones, MP3 players, mobile phones, computers, televisions, automotive parts, etc. In one particular embodiment, the molded part may be employed in a camera module, such as those commonly employed in wireless communication devices (e.g., cellular telephone). For example, the camera module may employ a base, carrier assembly mounted on the base, a cover mounted on the carrier assembly, etc. The base may have a thickness of about 500 micrometers or less, in some embodiments from about 10 to about 450 micrometers, and in some embodiments, from about 20 to about 400 micrometers. Likewise, the carrier assembly may have a wall thickness of about 500 micrometers or less, in some embodiments from about 10 to about 450 micrometers, and in some embodiments, from about 20 to about 400 micrometers.

Figure 2:
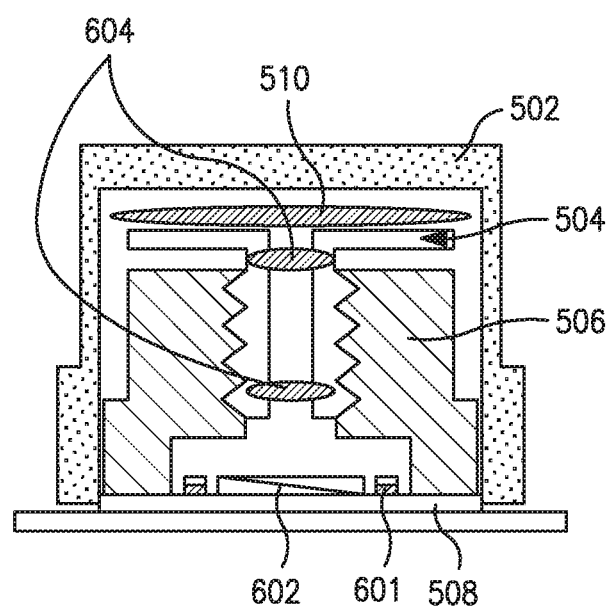

One particularly suitable camera module is shown in FIGS. 1-2. As shown, a camera module 500 contains a carrier assembly 504 that overlies a base 506. The base 506, in turn, overlies an optional main board 508. Due to their relatively thin nature, the base 506 and/or main board 508 are particularly suited to be molded from the polymer composition of the present invention as described above. The carrier assembly 504 may have any of a variety of configurations as is known in the art. In one embodiment, for example, the carrier assembly 504 may contain a hollow barrel that houses one or more lenses 604, which are in communication with an image sensor 602 positioned on the main board 508 and controlled by a circuit 601. The barrel may have any of a variety of shapes, such as rectangular, cylindrical, etc. In certain embodiments, the barrel may be formed from the polymer composition of the present invention and have a wall thickness within the ranges noted above. It should be understood that other parts of the camera module may also be formed from the polymer composition of the present invention. For example, as shown, a cover may overly the carrier assembly 504 that includes, for example, a substrate 510 (e.g., film) and/or thermal insulating cap 502. In some embodiments, the substrate 510 and/or cap 502 may also be formed from the polymer composition.

The present invention may be better understood with reference to the following examples.

Test Methods

Melt Viscosity: The melt viscosity (Pa-s) may be determined in accordance with ISO Test No. 11443:2005 at a shear rate of 1000 s$^{-1}$ and temperature 15° C. above the melting temperature (e.g., 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation at Break: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength: Notched Charpy properties may be tested according to ISO Test No. ISO 179-1: 2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Rockwell Hardness: Rockwell hardness is a measure of the indentation resistance of a material and may be determined in accordance with ASTM D785-08 (Scale M). Testing is performed by first forcing a steel ball indentor into the surface of a material using a specified minor load. The load is then increased to a specified major load and decreased back to the original minor load. The Rockwell hardness is a measure of the net increase in depth of the indentor, and is calculated by subtracting the penetration divided by the scale division from 130.

Dimensional Stability: The degree of shrinkage of a sample in a given direction may be determined in accordance with ISO 294-4:2001 (technically equivalent to ASTM D955-08(2014)). For example, parts may be injection molded with a mold cavity having a machine direction dimension or length ($L_m$) of 60 mm, a transverse dimension or width ($W_m$) of 60 mm, and a height dimension ($H_m$) of 2 mm, which conforms to a Type D2 specimen. The average length ($L_s$) and width ($W_s$) of five (5) test specimens may be measured after removal from the mold and cooling. The shrinkage in the flow (or length) direction ($S_F$) may be calculated by $S_F=(L_m-L_s)\times 100/L_m$, and the shrinkage in the transverse (or width) direction ($S_T$) may be calculated by $S_w=(W_m-W_s)\times 100/W_m$. The "dimensional stability" may thereafter be determined by dividing the degree of shrinkage in the transverse direction by the degree of shrinkage in the machine direction.

Surface/Volume Resistivity: The surface and volume resistivity values may be determined in accordance with IEC 60093 (equivalent to ASTM D257-07). According to this procedure, a standard specimen (e.g., 1 meter cube) is placed between two electrodes. A voltage is applied for sixty (60) seconds and the resistance is measured. The surface resistivity is the quotient of the potential gradient (in V/m) and the current per unit of electrode length (in A/m), and generally represents the resistance to leakage current along the surface of an insulating material. Because the four (4) ends of the electrodes define a square, the lengths in the quotient cancel and surface resistivities are reported in ohms, although it is also common to see the more descriptive unit of ohms per square. Volume resistivity is also determined as the ratio of the potential gradient parallel to the current in a material to the current density. In SI units, volume resistivity is numerically equal to the direct-current resistance between opposite faces of a one-meter cube of the material (ohm-m).

Example 1

Samples 1-2 are formed from various percentages of a liquid crystalline polymer, barium sulfate, epoxy-functionalized olefin copolymer, lubricant (Glycolube™ P), conductive filler, and black color masterbatch, as indicated in Table 1 below. The epoxy-functionalized olefin copolymer is a terpolymer formed from ethylene, butyl acrylate, and glycidyl methacrylate (Elvaloy® PTW, DuPont). The barium sulfate has a median diameter of about 4 micrometers. The black color masterbatch contains 80 wt. % liquid crystalline polymer and 20 wt. % carbon black. The conductive filler includes an ionic liquid—i.e., tri-n-butylmethylammonium bis(trifluoromethanesulfonyl)-imide (FC-4400 from 3M). The liquid crystalline polymer in each of the samples is formed from HBA, HNA, TA, BP, and APAP, such as described in U.S. Pat. No. 5,508,374 to Lee, et al. Compounding is performed using an 18-mm single screw extruder. Parts are injection molded the samples into plaques (60 mm×60 mm).

TABLE 1

|  | Sample | |
| --- | --- | --- |
|  | 1 | 2 |
| LCP | 47.2 | 43.2 |
| Epoxy-Functionalized Olefin Copolymer | — | 4.0 |
| Lubricant | 0.3 | 0.3 |
| FC-4400 | 0.8 | 0.8 |
| Black Color Masterbatch | 12.5 | 12.5 |
| Barium Sulfate | 40 | 40 |

The molded parts are also tested for thermal and mechanical properties. The results are set forth below in Table 2.

TABLE 2

|  | Sample | |
| --- | --- | --- |
|  | 1 | 2 |
| MV1000 (Pa-s) | 18 | 32 |
| MV400 (Pa-s) | 27 | 51 |
| Melting Temp (° C.) ($1^{st}$ Heat) | 327 | 331 |
| DTUL @ 1.8 MPa (° C.) | 221 | 219 |
| Charpy Notched (kJ/m$^2$) | 6 | 8 |
| Tensile Strength (MPa) | 115 | 106 |
| Tensile Modulus (MPa) | 8,165 | 6,992 |
| Tensile Elongation at Break (%) | 3.5 | 4.4 |
| Flexural Strength (MPa) | 131 | 107 |

TABLE 2-continued

| | Sample | |
|---|---|---|
| | 1 | 2 |
| Flexural Modulus (MPa) | 8,718 | 7,191 |
| Rockwell Hardness (M-scale) | 58 | 38 |
| Shrinkage in the Length Direction ($S_F$) (%) | 0.24 | 0.25 |
| Shrinkage in the Width Direction ($S_T$) (%) | 0.93 | 0.94 |
| Dimensional Stability | 4 | 4 |

Example 2

Samples 3-4 are formed from various percentages of a liquid crystalline polymer, calcium pyrophoshpate, epoxy-functionalized olefin copolymer, lubricant (Glycolube™ P), and black color masterbatch, as indicated in Table 3 below. The epoxy-functionalized olefin copolymer is a terpolymer formed from ethylene, butyl acrylate, and glycidyl methacrylate (Elvaloy® PTW, DuPont). The calcium pyrophosphate has a median particle size of about 6 micrometers. The black color masterbatch contains 80 wt. % liquid crystalline polymer and 20 wt. % carbon black. The liquid crystalline polymer in each of the samples is formed from HBA, HNA, TA, BP, and APAP, such as described in U.S. Pat. No. 5,508,374 to Lee, et al. Compounding is performed using an 18-mm single screw extruder. Parts are injection molded the samples into plaques (60 mm×60 mm).

TABLE 3

| | Sample | |
|---|---|---|
| | 3 | 4 |
| LCP | 47.2 | 43.2 |
| Epoxy-Functionalized Olefin Copolymer | — | 4.0 |
| Lubricant | 0.3 | 0.3 |
| Black Color Masterbatch | 12.5 | 12.5 |
| Calcium Pyrophosphate | 40 | 40 |

The molded parts are also tested for thermal and mechanical properties. The results are set forth below in Table 4.

TABLE 4

| | Sample | |
|---|---|---|
| | 3 | 4 |
| MV1000 (Pa-s) | 40 | 92 |
| MV400 (Pa-s) | 54 | 135 |
| Melting Temp (° C.) (1$^{st}$ Heat) | 329 | 331 |
| DTUL @ 1.8 MPa (° C.) | 220 | 207 |
| Charpy Notched (kJ/m$^2$) | 5 | 9 |
| Tensile Strength (MPa) | 102 | 97 |
| Tensile Modulus (MPa) | 8,374 | 7,016 |
| Tensile Elongation at Break (%) | 4.0 | 5.4 |
| Flexural Strength (MPa) | 124 | 114 |
| Flexural Modulus (MPa) | 8,878 | 8,317 |
| Rockwell Hardness (M-scale) | 62 | 41 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A camera module comprising a molded part, wherein the molded part comprises a polymer composition that comprises a liquid crystalline polymer, an inorganic particulate material having a median particle size of from about 0.1 to about 35 micrometers, and an olefin copolymer, wherein the polymer composition exhibits a tensile elongation at break of about 4% or more as determined in accordance with ISO Test No. 527:2012 at 23° C. and a Charpy notched impact strength of about 6 kJ/m$^2$ or more as determined in accordance with ISO Test No. 179-1:2010 at 23° C.

2. The camera module of claim 1, wherein the inorganic particulate material has a hardness value of about 2.5 or more based on the Mohs hardness scale.

3. The camera module of claim 1, wherein the inorganic particulate material has a median size of from about 2 to about 20 micrometers.

4. The camera module of claim 1, wherein the camera module comprises a generally planar base on which is mounted a carrier assembly, wherein the base, carrier assembly, or both contain the molded part.

5. The camera module of claim 1, wherein the camera module contains a base comprising the polymer composition.

6. The camera module of claim 1, wherein the camera module contains a main board comprising the polymer composition.

7. The camera module of claim 1, wherein the camera module contains a cover including a film comprising the polymer composition.

8. The camera module of claim 1, wherein the camera module contains a thermal insulating cap comprising the polymer composition.

9. The camera module of claim 1, wherein the composition comprises a lubricant in an amount from about 0.05 wt. % to about 1.5 wt. %.

10. The camera module of claim 1, wherein the composition is free of glass fiber.

11. The camera module of claim 1, wherein the composition is free of mineral fibers.

12. The camera module of claim 1, wherein the liquid crystalline polymer constitutes from about 20 wt. % to about 80 wt. % of the composition.

13. The camera module of claim 1, wherein the polymer composition has a melt viscosity of from about 20 to about 120 Pa-s, determined at a shear rate of 1000 seconds$^{-1}$.

14. The camera module of claim 1, wherein the composition exhibits a tensile strength of from about 60 to about 350 MPa determined in accordance with ISO Test No. 527:2012 at 23° C.

15. The camera module of claim 1, wherein the composition exhibits a tensile modulus of from about 6,000 MPa to about 12,000 MPa determined in accordance with ISO Test No. 527:2012 at 23° C.

16. The camera module of claim 1, wherein the composition exhibits a flexural strength of from 80 to about 350 MPa as determined in accordance with ISO Test No. 178:2010 at 23° C.

17. The camera module of claim 1, wherein the composition exhibits a flexural modulus of from about 6,000 MPa to about 15,000 MPa as determined in accordance with ISO Test No. 178:2010 at 23° C.

18. The camera module of claim 1, wherein the composition exhibits a deflection temperature under load (DTUL) of from about 200° C. to about 280° C. as measured according to ASTM D648-07 at a specified load of 1.8 MPa.

19. The camera module of claim 1, wherein the composition exhibits a Rockwell hardness of from about 25 to about 80, as determined in accordance with ASTM D785-08 (Scale M).

20. The camera module of claim 1, wherein the composition exhibits a volume resistivity of from about $1\times10^{10}$ ohm-m to about $9\times10^{14}$ ohm-m.

21. The camera module of claim 1, wherein the composition exhibits a surface resistivity of from about $1\times10^{17}$ ohms to about $1\times10^{26}$ ohms.

22. The camera module of claim 1, wherein the polymer composition exhibits a tensile elongation at break of from about 4% to about 10% as determined in accordance with ISO Test No. 527:2012 at 23° C.

23. The camera module of claim 1, wherein the polymer composition exhibits a Charpy notched impact strength of from about 6 kJ/m² to about 25 kJ/m² as determined in accordance with ISO Test No. 179-1:2010 at 23° C.

24. The camera module of claim 1, wherein the polymer composition exhibits a dimensional stability of about 6 or less as determined in accordance with ISO 294-4:2001 using a Type D2 specimen.

25. The camera module of claim 1, wherein the liquid crystalline polymer contains units derived from 4-hydroxybenzoic acid in an amount from about 45 mol. % to about 70 mol. %, units derived from terephthalic acid in an amount from about 15 mol. % to about 35 mol. %, units derived from 4,4'-biphenol in an amount from about 5 mol. % to about 20 mol. %, units derived from 6-hydroxy-2-naphthoic acid in an amount from about 3 mol. % to about 25 mol. %, and units derived from acetaminophen in an amount from about 1 mol. % to about 35 mol. % of the liquid crystalline polymer.

26. The camera module of claim 1, wherein the liquid crystalline polymer constitutes from about 43.2 wt. % to about 70 wt. % of the polymer composition, the epoxy-functionalized olefin copolymer constitutes from about 1 wt. % to about 4 wt. % of the polymer composition, the inorganic particulate material comprises from about 25 wt. % to about 40 wt. % of the polymer composition, and a lubricant constitutes from about 0.05 wt. % to about 1.5 wt. % of the polymer composition.

27. The camera module of claim 26, wherein the polymer composition exhibits a tensile elongation at break from about 5% to about 10% as determined in accordance with ISO Test No. 527:2012 at 23° C., a Charpy notched impact strength from about 9 kJ/m² to about 25 kJ/m² as determined in accordance with ISO Test No. 179-1:2010 at 23° C., and a melt viscosity from about 20 to about 120 Pa-s, determined at a shear rate of 1000 seconds⁻¹.

28. The camera module of claim 27, wherein the inorganic particulate material has a hardness value of about 2.5 or more based on the Mohs hardness scale.

29. The camera module of claim 27, wherein the olefin copolymer is an epoxy-functionalized olefin copolymer.

30. A mobile phone comprising the camera module of claim 1.

31. A camera module comprising a molded part, wherein the molded part comprises a polymer composition that comprises a liquid crystalline polymer, an inorganic particulate material having a median particle size of from about 0.1 to about 35 micrometers, and an olefin copolymer, wherein the polymer composition exhibits a tensile elongation at break of about 4% or more as determined in accordance with ISO Test No. 527:2012 at 23° C., a Charpy notched impact strength of about 6 kJ/m² or more as determined in accordance with ISO Test No. 179-1:2010 at 23° C., a tensile strength of from about 60 to about 350 MPa determined in accordance with ISO Test No. 527:2012 at 23° C., a Rockwell hardness of from about 25 to about 80, as determined in accordance with ASTM D785-08 (Scale M), and a deflection temperature under load (DTUL) of from about 200° C. to about 280° C. as measured according to ASTM D648-07 at a specified load of 1.8 MPa.

32. The camera module of claim 31, wherein the inorganic particulate material has a hardness value of about 2.5 or more based on the Mohs hardness scale.

33. The camera module of claim 31, wherein the inorganic particulate material has a median size of from about 2 to about 20 micrometers.

34. The camera module of claim 31, wherein the camera module comprises a generally planar base on which is mounted a carrier assembly, wherein the base, carrier assembly, or both contain the molded part.

35. The camera module of claim 31, wherein the camera module contains a base comprising the polymer composition.

36. The camera module of claim 31, wherein the camera module contains a main board comprising the polymer composition.

37. The camera module of claim 31, wherein the camera module contains a cover including a film comprising the polymer composition.

38. The camera module of claim 31, wherein the camera module contains a thermal insulating cap comprising the polymer composition.

39. The camera module of claim 31, wherein the composition comprises a lubricant in an amount from about 0.05 wt. % to about 1.5 wt. %.

40. The camera module of claim 31, wherein the composition is free of glass fiber.

41. The camera module of claim 31, wherein the composition is free of mineral fibers.

42. The camera module of claim 31, wherein the liquid crystalline polymer constitutes from about 20 wt. % to about 80 wt. % of the composition.

43. The camera module of claim 31, wherein the polymer composition has a melt viscosity of from about 20 to about 120 Pa-s, determined at a shear rate of 1000 seconds⁻¹.

44. The camera module of claim 31, wherein the composition exhibits a tensile modulus of from about 6,000 MPa to about 12,000 MPa determined in accordance with ISO Test No. 527:2012 at 23° C.

45. The camera module of claim 31, wherein the composition exhibits a flexural strength of from 80 to about 350 MPa as determined in accordance with ISO Test No. 178:2010 at 23° C.

46. The camera module of claim 31, wherein the composition exhibits a flexural modulus of from about 6,000 MPa to about 15,000 MPa as determined in accordance with ISO Test No. 178:2010 at 23° C.

47. The camera module of claim 31, wherein the composition exhibits a volume resistivity of from about $1\times10^{10}$ ohm-m to about $9\times10^{14}$ ohm-m.

48. The camera module of claim 31, wherein the composition exhibits a surface resistivity of from about $1\times10^{17}$ ohms to about $1\times10^{26}$ ohms.

49. The camera module of claim 31, wherein the polymer composition exhibits a tensile elongation at break of from about 4% to about 10% as determined in accordance with ISO Test No. 527:2012 at 23° C.

50. The camera module of claim 31, wherein the polymer composition exhibits a Charpy notched impact strength of from about 6 kJ/m² to about 25 kJ/m² as determined in accordance with ISO Test No. 179-1:2010 at 23° C.

51. The camera module of claim 31, wherein the polymer composition exhibits a dimensional stability of about 6 or less as determined in accordance with ISO 294-4:2001 using a Type D2 specimen.

52. The camera module of claim 31, wherein the liquid crystalline polymer contains units derived from 4-hydroxybenzoic acid in an amount from about 45 mol. % to about 70 mol. %, units derived from terephthalic acid in an amount from about 15 mol. % to about 35 mol. %, units derived from 4,4'-biphenol in an amount from about 5 mol. % to about 20 mol. %, units derived from 6-hydroxy-2-naphthoic acid in an amount from about 3 mol. % to about 25 mol. %, and units derived from acetaminophen in an amount from about 1 mol. % to about 35 mol. % of the liquid crystalline polymer.

53. The camera module of claim 31, wherein the liquid crystalline polymer constitutes from about 43.2 wt. % to about 70 wt. % of the polymer composition, the epoxy-functionalized olefin copolymer constitutes from about 1 wt. % to about 4 wt. % of the polymer composition, the inorganic particulate material comprises from about 25 wt. % to about 40 wt. % of the polymer composition, and a lubricant constitutes from about 0.05 wt. % to about 1.5 wt. % of the polymer composition.

54. The camera module of claim 53, wherein the polymer composition exhibits a tensile elongation at break from about 5% to about 10% as determined in accordance with ISO Test No. 527:2012 at 23° C., a Charpy notched impact strength from about 9 kJ/m² to about 25 kJ/m² as determined in accordance with ISO Test No. 179-1:2010 at 23° C., and a melt viscosity from about 20 to about 120 Pa-s, determined at a shear rate of 1000 seconds$^{-1}$.

55. The camera module of claim 54, wherein the inorganic particulate material has a hardness value of about 2.5 or more based on the Mohs hardness scale.

56. The camera module of claim 54, wherein the olefin copolymer is an epoxy-functionalized olefin copolymer.

57. A mobile phone comprising the camera module of claim 31.

58. A portable electronic device comprising a camera module, the camera module comprising a molded part, wherein the molded part comprises a polymer composition that comprises a liquid crystalline polymer, an inorganic particulate material having a median particle size of from about 0.1 to about 35 micrometers, and an olefin copolymer, wherein the polymer composition exhibits a tensile elongation at break of about 4% or more as determined in accordance with ISO Test No. 527:2012 at 23° C. and a Charpy notched impact strength of about 6 kJ/m² or more as determined in accordance with ISO Test No. 179-1:2010 at 23° C.

59. The portable electronic device of claim 58, wherein the inorganic particulate material has a hardness value of about 2.5 or more based on the Mohs hardness scale.

60. The portable electronic device of claim 58, wherein the inorganic particulate material has a median size of from about 2 to about 20 micrometers.

61. The portable electronic device of claim 58, wherein the composition comprises a lubricant in an amount from about 0.05 wt. % to about 1.5 wt. %.

62. The portable electronic device of claim 58, wherein the composition is free of glass fiber.

63. The portable electronic device of claim 58, wherein the composition is free of mineral fibers.

64. The portable electronic device of claim 58, wherein the liquid crystalline polymer constitutes from about 20 wt. % to about 80 wt. % of the composition.

65. The portable electronic device of claim 58, wherein the composition exhibits a tensile strength of from about 60 to about 350 MPa determined in accordance with ISO Test No. 527:2012 at 23° C.

66. The portable electronic device of claim 58, wherein the composition exhibits a deflection temperature under load (DTUL) of from about 200° C. to about 280° C. as measured according to ASTM D648-07 at a specified load of 1.8 MPa.

67. The portable electronic device of claim 58, wherein the composition exhibits a Rockwell hardness of from about 25 to about 80, as determined in accordance with ASTM D785-08 (Scale M).

68. The portable electronic device of claim 58, wherein the composition exhibits a volume resistivity of from about $1 \times 10^{10}$ ohm-m to about $9 \times 10^{14}$ ohm-m.

69. The portable electronic device of claim 58, wherein the composition exhibits a surface resistivity of from about $1 \times 10^{17}$ ohms to about $1 \times 10^{26}$ ohms.

70. The portable electronic device of claim 58, wherein the polymer composition exhibits a tensile elongation at break of from about 4% to about 10% as determined in accordance with ISO Test No. 527:2012 at 23° C.

71. The portable electronic device of claim 58, wherein the polymer composition exhibits a Charpy notched impact strength of from about 6 kJ/m² to about 25 kJ/m² as determined in accordance with ISO Test No. 179-1:2010 at 23° C.

72. The portable electronic device of claim 58, wherein the polymer composition exhibits a dimensional stability of about 6 or less as determined in accordance with ISO 294-4:2001 using a Type D2 specimen.

73. The portable electronic device of claim 58, wherein the liquid crystalline polymer contains units derived from 4-hydroxybenzoic acid in an amount from about 45 mol. % to about 70 mol. %, units derived from terephthalic acid in an amount from about 15 mol. % to about 35 mol. %, units derived from 4,4'-biphenol in an amount from about 5 mol. % to about 20 mol. %, units derived from 6-hydroxy-2-naphthoic acid in an amount from about 3 mol. % to about 25 mol. %, and units derived from acetaminophen in an amount from about 1 mol. % to about 35 mol. % of the liquid crystalline polymer.

74. The portable electronic device of claim 58, wherein the liquid crystalline polymer constitutes from about 43.2 wt. % to about 70 wt. % of the polymer composition, the epoxy-functionalized olefin copolymer constitutes from about 1 wt. % to about 4 wt. % of the polymer composition, the inorganic particulate material comprises from about 25 wt. % to about 40 wt. % of the polymer composition, and a lubricant constitutes from about 0.05 wt. % to about 1.5 wt. % of the polymer composition.

75. The portable electronic device of claim 74, wherein the polymer composition exhibits a tensile elongation at break from about 5% to about 10% as determined in accordance with ISO Test No. 527:2012 at 23° C., a Charpy notched impact strength from about 9 kJ/m² to about 25 kJ/m² as determined in accordance with ISO Test No. 179-1:2010 at 23° C., and a melt viscosity from about 20 to about 120 Pa-s, determined at a shear rate of 1000 seconds$^{-1}$.

76. The portable electronic device of claim 75, wherein the inorganic particulate material has a hardness value of about 2.5 or more based on the Mohs hardness scale.

77. The portable electronic device of claim 75, wherein the olefin copolymer is an epoxy-functionalized olefin copolymer.

78. The portable electronic device of claim 58, wherein the portable electronic device is a smart phone.

79. The portable electronic device of claim 58, wherein the portable electronic device is an MP3 player.

80. The portable electronic device of claim 58, wherein the portable electronic device is a mobile phone.

81. The portable electronic device of claim 58, wherein the portable electronic device is a computer.

82. The portable electronic device of claim 58, wherein the portable electronic device is an automotive part.

\* \* \* \* \*